United States Patent [19]

Humphrey, Jr.

[11] 4,235,954
[45] Nov. 25, 1980

[54] POLYCARBONATE ARTICLE COATED WITH AN ADHERENT, DURABLE ORGANOPOLYSILOXANE COATING AND PROCESS FOR PRODUCING SAME

[75] Inventor: James S. Humphrey, Jr., Clemmons, N.C.

[73] Assignee: General Electric Company, Pittsfield, Mass.

[21] Appl. No.: 42,140

[22] Filed: May 24, 1979

Related U.S. Application Data

[63] Continuation-in-part of Ser. No. 895,665, Apr. 12, 1978, abandoned.

[51] Int. Cl.³ .................. B32B 27/36; B32B 27/30; B32B 27/08; G02B 1/08
[52] U.S. Cl. ................... 428/412; 204/159.13; 427/54.1; 427/160; 427/163; 427/164; 427/387; 428/447; 428/448; 428/451; 428/522; 526/279
[58] Field of Search ............... 204/159.13; 427/54.1, 427/160, 163, 164, 387; 428/331, 412, 447, 451, 448, 522; 526/279

[56] References Cited

U.S. PATENT DOCUMENTS

| 2,976,184 | 3/1961 | Blatz | 427/387 |
|---|---|---|---|
| 3,379,607 | 4/1968 | Foster | 428/447 |
| 3,396,046 | 8/1968 | Landau | 428/412 |
| 3,451,838 | 6/1969 | Burzynski | 428/412 |
| 3,582,398 | 6/1971 | Ringer | 428/412 |
| 3,650,808 | 3/1972 | Gagnon | 428/412 |
| 3,652,379 | 3/1972 | White | 428/412 |
| 3,661,685 | 5/1972 | Osteen | 428/412 |
| 3,681,167 | 8/1972 | Moore | 428/412 |
| 3,707,397 | 12/1972 | Gagnon | 428/412 |
| 3,835,090 | 9/1974 | Gander | 527/279 |
| 3,968,305 | 7/1976 | Oshima | 428/412 |
| 3,968,309 | 7/1976 | Matsuo | 428/409 |
| 3,978,178 | 8/1976 | Oshima | 428/412 |
| 3,986,997 | 10/1976 | Clark | 428/412 |
| 4,019,904 | 4/1977 | Noshiro | 204/159.13 |
| 4,026,826 | 5/1977 | Voshida | 526/279 |
| 4,027,072 | 5/1977 | Molari | 428/412 |
| 4,027,073 | 5/1977 | Clark | 428/447 |
| 4,041,120 | 8/1977 | Oshima | 264/171 |
| 4,045,602 | 8/1977 | Sommer | 427/387 |
| 4,064,286 | 12/1977 | Hahn | 204/159.13 |
| 4,073,967 | 2/1978 | Sandvig | 204/159.13 |
| 4,082,635 | 4/1978 | Fritz | 428/447 |
| 4,100,329 | 7/1978 | Neithardt | 428/448 |
| 4,103,065 | 7/1978 | Gagnon | 428/447 |
| 4,133,938 | 1/1979 | Bingham | 428/447 |

Primary Examiner—Ellis P. Robinson
Attorney, Agent, or Firm—William F. Mufatti

[57] ABSTRACT

A coated polycarbonate article comprising a polycarbonate substrate having (i) a primer layer comprising a UV cured reaction product of a polyfunctional acrylic ester monomer and an organic silicon compound of the formula $R^3{}_cSiX_{(4-c)}$ wherein $R^3$ is an organic moiety containing olefinic unsaturation, X is an alkoxy, acyloxy and aryloxy group, and c is an integer of from 1 to 3; and (ii) a thermoset organopolysiloxane coating on said UV cured primer layer.

A process for producing a coated polycarbonate article comprising (i) priming a polycarbonate substrate with a UV curable primer composition containing (a) a polyfunctional acrylic ester monomer, (b) an organic silicon compound of the formula $R^3{}_cSiX_{(4-c)}$, wherein R, X and c are as defined above; and (c) a UV photo initiator; (ii) UV curing said primer composition; (iii) applying an organopolysiloxane coating composition to the primed substrate; and (iv) curing the organopolysiloxane.

36 Claims, No Drawings

POLYCARBONATE ARTICLE COATED WITH AN ADHERENT, DURABLE ORGANOPOLYSILOXANE COATING AND PROCESS FOR PRODUCING SAME

This application is a continuation in part of copending application Ser. No. 895,665, filed Apr. 12, 1978 now abandoned.

This invention relates to transparent organopolysiloxane coated polycarbonate articles wherein the polysiloxane is tenaciously adherent to the polycarbonate substrate and to a process for producing such an article. More particularly, the present invention is an organopolysiloxane coated polycarbonate article having a primer layer between the polycarbonate and the organopolysiloxane comprising the UV light cured reaction product of a polyfunctional acrylic acid ester monomer and a certain organic silicon compound. The process for producing said article comprises priming the polycarbonate substrate with an adhesion promoting, thermosettable composition comprised of a polyfunctional acrylic acid ester monomer, a specific organic silicon compound and a photocure initiator by forming a thin film thereon; curing said primer film by exposure to ultraviolet light; then coating the primed surface with a further-curable organopolysiloxane; and finally curing said further-curable organopolysiloxane.

BACKGROUND OF THE INVENTION

The use of transparent glazing materials utilizing polycarbonate resin as a structural component for windows, windshields, and the like are well known. While these polycarbonate resins are easily fabricated into the desired shape and have excellent physical and chemical properties, such as being less dense than glass and having more breakage resistance than glass, their abrasion, scatch and mar resistance is relatively low.

In order to overcome this relatively low scratch and mar resistance, various coatings have been applied to the polycarbonate resins. U.S. Pat. Nos. 3,451,838, 3,986,997 and 4,027,073 disclose a coating composition and technique for the application of organopolysiloxane coatings onto these surfaces. While these coatings have many desirable properties, e.g., they are hard, mar-resistant, scratch-resistant, and chemical solvent resistant, these organopolysiloxane coatings do not in all instances possess the desired degree of uniform adherence to and durability on these polycarbonate surfaces. There is a need for polycarbonate articles having uniformly, tenaciously and durably adhered scratch, mar, and chemical solvent resistant coatings thereon, and it is a primary object of the present invention to provide such articles and a relatively simple and economical process for producing these articles.

DESCRIPTION OF THE INVENTION

This invvention relates to organopolysiloxane coated polycarbonate articles having an adhesion promoting primer layer and to a process for producing these articles.

In the practice of the present invention, prior to the application of the organopolysiloxane coating to the polycarbonate surface, the surface is first primed by the application of a UV curable primer composition containing a polyfunctional acrylic ester monomer, an organic silicon compound, and a UV photoinitiator. This primer composition is cured by exposure to UV light, and then the organopolysiloxane coating is applied thereon.

The aromatic carbonate polymer of the instant invention has recurring units of the formula:

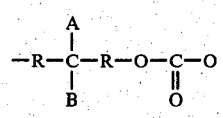

wherein each —R— is selected from the group consisting of phenylene, halo-substituted phenylene and alkyl substituted phenylene; and A and B are each selected from the group consisting of hydrogen, hydrocarbon radicals free from aliphatic unsaturation and of radicals which together with the adjoining —C— atom form a cycloalkane radical, the total number of carbon atoms in A and B being up to 12.

The aromatic carbonate polymer of this invention may be prepared by methods well known in the art and as described in U.S. Pat. No. 3,989,672, all of which are incorporated by reference.

Also included herein are branched polycarbonates wherein a polyfunctional aromatic compound is reacted with the dihydric phenol and carbonate precursor to provide a thermoplastic randomly branched polycarbonate wherein the recurring units of formula I. contain branching groups.

The preferred polycarbonate resins may be derived from the reaction of bisphenol-A and phosgene. These polycarbonates have from 10–400 recurring units of the formula:

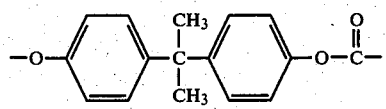

The polycarbonate should have an intrinsic viscosity between 0.3 and 1.0, preferably from 0.40 to 0.65 as measured at 25° C. in methylene chloride.

The UV curable primer composition comprises: (i) a polyfunctional acrylic ester monomer; (ii) a certain organic silicon compound; and (iii) a UV cure initiator. The polyfunctional acrylic ester monomers of the present invention are represented by the general formula:

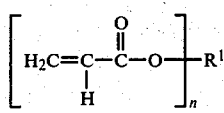

wherein n is an integer from 2 to 8, preferably from 2 to 6, and more preferably from 2 to 4, inclusive; and, $R^1$ is an n valent saturated aliphatic hydrocarbon radical, n valent substituted saturated aliphatic hydrocabon radical, n valent ether radical, n valent polyether radical, n valent substituted ether radical, n valent substituted polyether radical, n valent olefinically unsaturated aliphatic hydrocarbon radical, n valent substituted olefinically unsaturated aliphatic hydrocarbon radical, n valent aromatic hydrocarbon radicals, and n valent substituted aromatic hydrocarbon radicals.

By n valent saturated aliphatic hydrocarbon radicals is meant n valent radicals derived from saturated aliphatic hydrocarbons, i.e., alkanes, by removal of n hydrogens therefrom. Preferred n valent saturated aliphatic hydrocarbon radicals are those containing from 1 to about 20 carbon atoms. Some non-limiting examples of these preferred n valent saturated aliphatic hydrocarbon radicals include

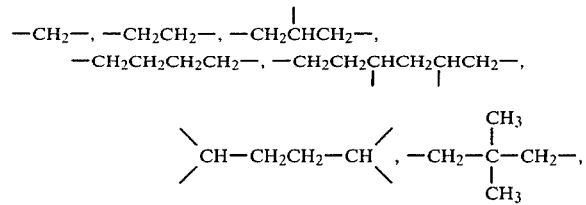

and the like.

These n valent saturated aliphatic hydrocarbon radicals may contain substituent groups thereon. Preferred n valent substituted saturated aliphatic hydrocarbon radicals are those containing from 1 to about 20 carbon atoms. These preferred n valent substituted saturated aliphatic hydrocarbon radicals can contain substituent groups such as the halogens, i.e., fluorine, chlorine, bromine and iodine, hydroxyl, —COOR$^2$, —OR$^2$, —CN, —COOH, —NO$_2$, —NH$_2$, and —NR$^2$ wherein R$^2$ represents alkyl radicals containing from 1 to about 6 carbon atoms. Some non-limiting examples of n valent substituted saturated aliphatic hydrocarbon radicals include

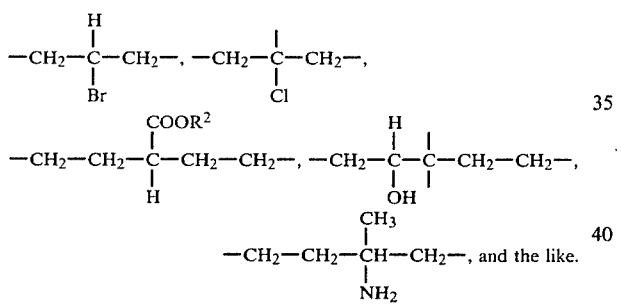

By n valent olefinically unsaturated aliphatic hydrocarbon radicals is meant n valent radicals derived from olefinically unsaturated aliphatic hydrocarbons, i.e., alkenes, by removal of n hydrogens therefrom. Preferred n valent olefinically unsaturated aliphatic hydrocarbon radicals are those containing from 2 to about 20 carbon atoms. Some non-limiting examples of these radicals include

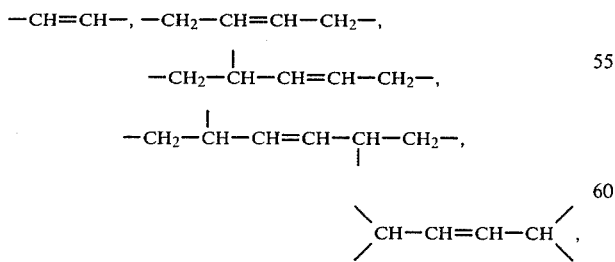

and the like.

These n valent olefinically unsaturated aliphatic hydrocarbon radicals may contain substituent groups thereon. Preferred n valent substituted olefinically unsaturated aliphatic hydrocarbon radicals are those containing from 2 to about 20 carbon atoms. These radicals can contain substituent groups such as the halogens, —COOR$^2$, —OR$^2$, —CN, —COOH, —NO$_2$, —NH$_2$, and —NR$^2$ wherein R$^2$ is as defined above. Some non-limiting examples of n valent substituted olefinically unsaturated aliphatic hydrocarbon radicals include

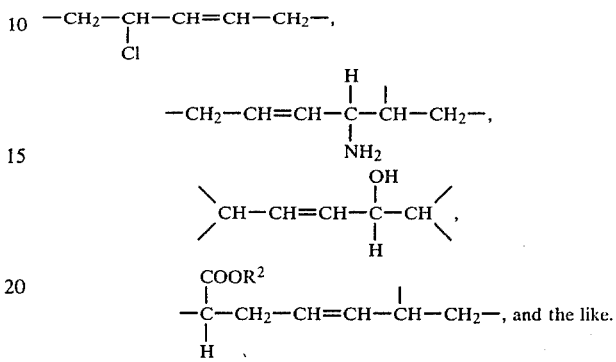

By n valent ether radicals is meant n valent radicals derived from ethers by removal of n hydrogens therefrom. Preferred n valent ether radicals are those containing from 2 to about 20 carbon atoms. Some non-limiting examples of these n valent ether radicals include

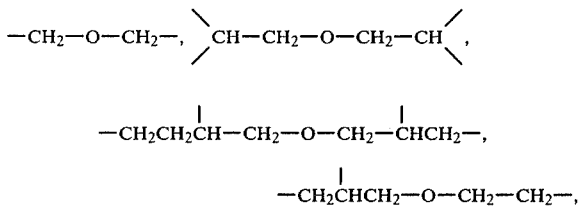

and the like.

These n valent ether radicals may contain substituent groups thereon. Preferred n valent substituent ether radicals are those containing from 2 to about 20 carbon atoms. These radicals can contain substituent groups such as the halogens, —COOR$^2$, —OR$^2$, —CN, —COOH, —NO$_2$, —NH$_2$, and —NR$^2$ wherein R$^2$ is as defined above. Some non-limiting examples of n valent substituted ether radicals include

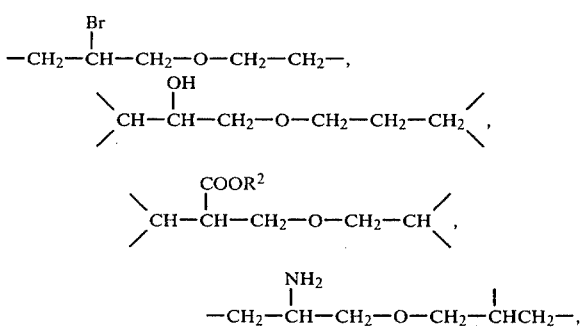

and the like.

By n valent polyether radicals is meant n valent radicals derived from polyethers, which polyethers are represented by the general formula $\text{---}(\text{R}^{3'}\text{O})_x\text{---}$ wherein x is an integer from 2 to about 5 and $R^3$ is a lower alkyl, by removal of n hydrogens therefrom. Preferred n valent polyether radicals are those containing from 3 to about 20 carbon atoms. Some non-limiting examples of these n valent polyether radicals include —$CH_2$—$CH_2$—O—$CH_2CH_2$—O—$CH_2CH_2$—,

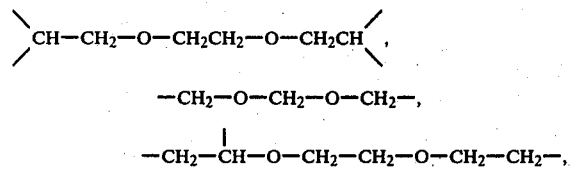

—$CH_2$—O—$CH_2$—O—$CH_2$—,

—$CH_2$—$CH$—O—$CH_2$—$CH_2$—O—$CH_2$—$CH_2$—, and the like.

These n valent polyether radicals may contain substituent groups such as halogens, hydroxyl, —$COOR^2$, —CN, —COOH, —$NO_2$, —$NH_2$, and —$NR^2$ thereon. Some non-limiting examples of these n valent substituted polyether radicals include $$-CH_2-\overset{Cl}{\underset{|}{CH}}-CH_2-O-CH_2CH_2CH_2-O-CH_2CH_2CH_2-,$$

$$\overset{NH_2}{\underset{|}{C-CH}}-CH_2-O-CH_2-\overset{|}{CH}-CH_2-O-CH_2-CH_2-CH_2-O-CH_2CH_2CH_2-,$$

$$\overset{Br}{\underset{|}{-CH}}-CH_2-O-CH_2CH_2-O-CH_2CH_2-O-CH_2CH_2-, \text{ and the like.}$$

By n valent aromatic hydrocarbon radicals is meant n valent radicals derived from aromatic hydrocarbons, e.g., benzene, naphthalene and anthracene, by removal of n hydrogens therefrom. Preferred n valent aromatic hydrocarbon radicals are those containing from 6 to 18 carbon atoms. Some non-limiting examples of these preferred n valent saturated aliphatic hydrocarbon radicals include

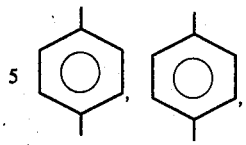

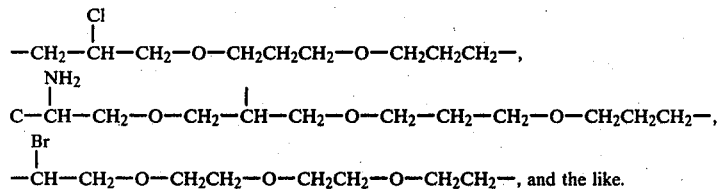

and the like. These n valent aromatic hydrocarbon radicals may further contain substituent groups such as halogens, lower alkyls, hydroxyl, —$COOR^2$, —COOH, —$NH_2$, —$NO_2$, —$OR^2$, and —CN thereon.

It is to be understood that where substituent groups are present, they should be such that they do not unduly hinder or interfere with the photocure of the polyfunctional acrylic monomers.

In the practice of the present invention, it is preferred that $R^1$ be a n valent saturated aliphatic hydrocarbon radical, a n valent ether radical, or a n valent polyether radical.

More particularly, the difunctional acrylic monomers, or diacrylates, are represented by formula III wherein n is 2; the trifunctional acrylic monomers, or triacrylates, are represented by formula III wherein n is 3; and the tetra-functional acrylic monomers, or tetraacrylates, are represented by formula III wherein n is 4.

Illustrative polyfunctional acrylate ester monomers of formula III are set forth below in TABLE I.

TABLE I

Diacrylates of Formula III

1. $CH_2$=CHCOO—$CH_2$—OOCCH=$CH_2$
2. $CH_2$=CHCOO—$CH_2$—$CH_2$—OOCCH=$CH_2$
3. $CH_2$=CHCOO—$CH_2$—CHOHCH$_2$—OOCCH=$CH_2$
4. $CH_2$=CHCOO—$(CH_2)_6$—OOCCH—$CH_2$
5. $CH_2$=CHCOO—$CH_2$—$CH_2$—$\underset{\underset{OOCCH=CH_2}{|}}{CH}$—$CH_3$
6. $CH_2$=CHCOO—$CH_2CH_2OCH_2CH_2$—OOCCH—$CH_2$
7. CH=CHCOO—$CH_2CH_2OCH_2CH_2OCH_2CH_2OCH_2CH_2$—OOCCH=$CH_2$
8. $CH_2$=CHCOO—$CH_2$—$\underset{\underset{CH_3}{|}}{\overset{\overset{CH_3}{|}}{C}}$—OOCCH—$CH_2$
9. $CH_2$—CHCOO—$CH_2$—$\underset{\underset{CH_3}{|}}{\overset{\overset{CH_3}{|}}{C}}$—OOCCH=$CH_2$
10. $CH_2$=CHCOO—$CH_2$—$\underset{\underset{CH_3}{|}}{\overset{\overset{CH_2OH}{|}}{C}}$—OOCCH=$CH_2$
11. $CH_2$—CHCOO—$CH_2$—$\underset{\underset{CH_2OH}{|}}{\overset{\overset{CH_2OH}{|}}{C}}$—OOCCH=$CH_2$ TABLE I-continued 12. 
$$CH_2=CHCOO-CH_2-\underset{\underset{CH_2Br}{|}}{\overset{\overset{CH_2OH}{|}}{C}}-OOCCH=CH_2$$

13. $CH_2=CHCOO-CH_2-CH=CH-CH_2-CH_3-OOCCH=CH_2$

14. 
$$CH_2=CHCOO-CH_2-CH=CH-CH_2-OOCH=CH_2$$
$$\phantom{CH_2=CHCOO-CH_2-CH=CH-CH_2}|\phantom{OOCH=CH_2}$$
$$\phantom{CH_2=CHCOO-CH_2-CH=CH-CH_2}CH_2OH$$

15. 
$$CH_2=CHCOO-CH_2-\underset{\underset{CH_2Cl}{|}}{\overset{\overset{CH_2OH}{|}}{C}}-CH_2OOCCH=CH_2$$

16. 
$$CH_2=CHCOO-CH_2-\underset{}{\overset{\overset{OCH_3}{|}}{CH}}-CH_2-OOCCH=CH_2$$

17. $CH_2=CHCOO-\phantom{X}\bigcirc\phantom{X}-OOCCH=CH_2$

18. 
$CH_2=CHCOO-\phantom{X}\overset{\overset{CH_3}{|}}{\bigcirc}\phantom{X}-OOCCH=CH_2$ 19. 
$CH_2=CHCOO-\phantom{X}\overset{\overset{Br}{|}}{\bigcirc}\phantom{X}-OOCCH=CH_2$ 20. 
$CH_2=CHCOO-\phantom{X}\overset{\overset{OH}{|}}{\bigcirc}\phantom{X}-OOCCH=CH_2$ 21. 
$$CH_2=CHCOO-CH_2CHCH_2-OOCCH=CH_2$$
$$\phantom{CH_2=CHCOO-CH_2C}|\phantom{H_2-OOCCH=CH_2}$$
$$\phantom{CH_2=CHCOO-CH_2}\bigcirc$$

22. 
$$CH_2=CHCOO-CH_2CH_2CH_2CH_2-OOCCH=CH_2$$
$$\phantom{CH_2=CHCOO-CH_2}\overset{\overset{OOCHCH_2}{|}}{\phantom{C}}$$

Triacrylates of Formula III

23. 
$$CH_2=CHCOO-CH_2$$
$$\phantom{XXXXXXXX}|$$
$$CH_2=CHCOO-CH_2-C-CH_2-CH_2$$
$$\phantom{XXXXXXXX}|$$
$$CH_2=CHCOO-CH_2$$

24. 
$$CH_2=CHCOO-CH_2-\underset{\underset{CH_2-OOCCH=CH_2}{|}}{\overset{\overset{CH_2OH}{|}}{C}}-CH_2-OOCCH=CH_2$$

25. 
$$\phantom{CH_2=CHCOO-}\overset{\overset{OOCCH=CH_2}{|}}{\phantom{X}}$$
$$CH_2=CHCOO-\bigcirc-OOCCH=CH_2$$

Tetraacrylates of Formula III

26. 
$$CH_2=CHCOO-CH_2$$
$$\phantom{XXXXXXXX}|$$
$$CH_2=CHCOO-CH_2-CH-CH_2-OOCCH=CH_2$$
$$\phantom{XXXXXXXX}|$$
$$CH_2-CHCOO-CH_2$$

27. 
$$CH_2=CHCOO-CH_2\phantom{X}CH\phantom{X}CH\phantom{X}CH_2-OOCCH=CH_2$$
$$\phantom{CH_2=CHCOO-CH_2\phantom{X}}|\phantom{XX}|$$
$$CH_2=CHOO-CH_2CH_2-OOCCH=CH_2$$

TABLE I-continued

28.  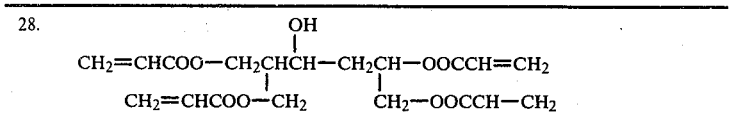

These polyacrylate esters and their production are well known to those skilled in the art. One method of producing the di-, tri-, and tetraacrylate esters involves reacting acrylic acid with a di-, tri-, or tetrahydroxyl compound to produce the diester, triester, or tetraester. Thus, for example, acrylic acid can be reacted with ethylene glycol to produce ethylene glycol diacrylate (compound 2 in Table I).

It is understood that the primer compositions may contain mixtures of two or more of the polyfunctional acrylate monomers or individual polyfunctional acrylate monomers. As a matter of fact, in certain instances, mixtures of two of said polyfunctional acrylates are preferred in the primer compositions.

The organic silicon compounds are represented by the formula $$R^3_c SiX_{4-c} \qquad \text{IV.}$$

wherein X independently represents an alkoxy, acyloxy, and aryloxy group, $R^3$ represents an organic moiety containing olefinic unsaturation, and c is an integer from 1 to 3. Preferred alkoxy groups are those containing from 1 to about 10 carbon atoms. Exemplary preferred alkoxy groups include methoxy, propoxy, butoxy, pentoxy, heptoxy and the like. Preferred acyloxy groups are those containing from 2 to about 10 carbon atoms. Exemplary preferred alkoxy groups include acetoxy, propionoxy, butyroxy, pentanoxy, hexanoxy and the like. The preferred acyloxy group is phenoxy.

$R^3$ represents an organic moiety containing olefinic unsaturation such that the organic compound of formula IV will co-react with the polyfunctional acrylic acid ester monomer of formula III upon exposure to UV light and in the presence of a UV photoinitiator to form a thermoset reaction product which, when applied to a polycarbonate substrate, improves the adhesion of organopolysiloxanes to said substrate. More particularly, $R^3$ is represented by the formula $$\begin{array}{cc} Y & O \\ | & \| \\ CH_2=C-C-O-R^4 \end{array} \qquad \text{V.}$$

wherein $R^4$ is a divalent saturated aliphatic hydrocarbon radical, preferably containing from 1 to about 12 carbon atoms and more preferably containing from 2 to 6 carbon atoms, and Y is hydrogen or methyl; and a maleamic acid radical represented by the formula

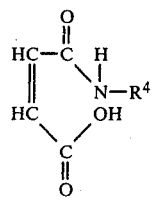 VI.

wherein $R^4$ is as defined above. Some non-limiting examples of $R^4$ include $-CH_2CH_2-$, $-CH_2-CH_2-CH_2-$,

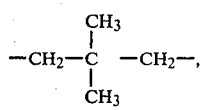

and the like.

The primer compositions of the instant invention may contain only one type of organic silicon compound of formula IV or they may contain mixtures of two or more, but preferably two, different organic silicon compounds. Thus, for example, the primer compositions may contain two different compounds of formula V, two different compounds of formula VI, or one compound of formula V and one compound of formula VI.

Generally, the primer composition contains, exclusive of any solvent present, 10 to about 90 weight percent of the polyfunctional acrylic acid ester monomer and from about 90 to about 10 weight percent of the organic silicon compound, preferably from abut 20 to about 80 weight percent of the polyfunctional acrylic acid ester monomer and from about 80 to about 20 weight percent of the organic silicon compound, and more preferably from about 30 to about 70 weight percent of the polyfunctional acrylic acid ester monomer and from about 70 to about 30 weight percent of the organic silicon compound.

The photocurable primer compositions also contain a photoinitiating amount of photoinitiator, i.e., an amount effective to effect the photocure of the coating composition. Generally, this amount is from about 0.01% to about 10% by weight, preferably from about 0.1% to about 5% by weight of the photocurable primer composition, exclusive of any solvent present. These additives and the cure thereof are generally well known in the art. Some non-limiting examples of these UV radiation photosensitizers include ketones, such as benzophenone, acetophenone, benzil, benzyl methyl ketone; benzoins and substituted benzoins such as benzoin methyl ether, α-hydroxymethyl benzoin isopropyl ether; halogen containing compounds such as α-bromoacetophenone, p-bromoacetophenone, α-chloromethylnaphthalene; sulfur compounds such as aromatic disulfides; and other photosensitizers such as azides, thicketones, or mixtures or synergistic mixtures thereof; the diaryl peroxides; the hydroperoxides; the peracids and peresters; the azo compounds; or any other known free radical initiator, such as di-t-butyl peroxide, benzoyl peroxide, 2,4-dichlorobenzoyl peroxide, t-butyl hydroperoxide, peroxyacetic acid, peroxybenzoic acid, t-butyl peroxyprivalate, t-butyl peracetate, azobisisobutyronitrile, and the like.

The primer compositions of the instant invention may also optionally contain various flatting agents, surface active agents, thixotropic agents, and UV light absorbers. All of these additives and the use thereof are well known in the art and do not require extensive discussions. Therefore, only a limited number will be referred to, it being understood that any compounds possessing the ability to function in such a manner, i.e., as a flatting agent, surface active agent, UV light absorber, and the like, can be used so long as they do not deleteriously affect the photocuring of the primer compositions and do not adversely affect the non-opaque character of the coated polycarbonate article.

The various surface-active agents, including anionic, cationic and nonionic surface-active agents are described in *Kirk-Othmer Encyclopedia of Chemical Technology*, Vol. 19, Interscience Publishers, New York, 1060, pp. 507–593, and *Encyclopedia of Polymer Science and Technology*, Vol. 13, Interscience Publishers, New York, 1970, pp. 477–486, both of which are references and incorporated herein.

The ultraviolet light absorbing compounds which can optionally be present in an amount effective to protect the polycarbonate substrate from the degradative effects of ultraviolet light, provided that they do not unduly interfere with or hinder the photocuring of the primer compositions. Some non-limiting examples of suitable ultraviolet light absorbing compounds are benzophenone derivatives such as 2,2'-dihydroxybenzophenone, 2,2',4,4'-tetrahydroxybenzophenone, 2,2'-dihdyroxy-4,4'-dimethoxybenzophenone, 2,2'-dihydroxy-4,4'-diethoxybenzophenone, 2,2'-dihydroxy-4,4'-dipropoxybenzophenone, 2,2'-dihydroxy-4,4'-dibutoxybenzophenone, 2,2'-dihydroxy-4-methoxy-4'-ethoxybenzophenone, 2,2'-dihydroxy-4-methoxy-4'-propoxybenzophenone, 2,2'-dihydroxy-4-methoxy-4'-butoxybenzophenone; and the like; and benzotriazole derivatives such as 2-(2'-hydroxy-5'-methylphenyl)-benzotriazole, 2-(2'-hydroxy-5'-tert-butylphenyl) benzotriazole, 2-(2'-hydroxy-3'-methyl-5'-tert-butylphenyl) benzotriazole, 2-(2'-hydroxy-5'-cyclohexylphenyl)-benzotriazole, 2'(2'-hydroxy-3',5'-dimethylphenyl) benzotriazole, and the like.

In the practice of the present invention, the photocurable primer compositions are first compounded by adding together the polyfunctional acrylic acid ester monomer, the organo silicon compound, the UV photoinitiator, and, optionally, any of the other aforementioned additives. Additionally, if so desired to reduce the viscosity of the primer formulation or to aid in solubilizing the organo silicon compounds, an organic solvent may be incorporated into the formulation. Generally, the amount of solvent, if any, present should be such that evaporation of the solvent occurs before any deleterious effect on the substrate due to the aggressiveness (in the chemical etching sense) of the primer composition develops. The various components are thoroughly mixed so as to form a generally homogeneous primer composition. A thin, uniform film of the primer solution is then applied onto the polycarbonate surface by any of the known means such as dipping, spraying, roll-coating and the like. Generally, the primer composition is applied in an amount sufficient to provide a cured film of from about 0.05 mil to about 0.5 mil, preferably from about 0.1 mil to about 0.3 mil thick. The primer film is then cured in an inert, e.g., nitrogen, atmosphere, by UV irradiation which can have a wavelength of from 1849A. to 4000A. The lamp systems used to generate such radiation can consist of ultraviolet lamps which can consist of discharge lamps, as for example, xenon, metallic halide, metallic arc, such as low or high pressure mercury vapor discharge lamps, etc., having generating pressure of from as low as a few millitorr up to about 10 atmospheres, can be employed. After UV curing, there is present on the surface of the polycarbonate a non-opaque primer which is adhered to the polycarbonate. This cured primer is the reaction product of the polyfunctional acrylic ester monomer and the organic silicon compound. While not wishing to be bound by any theory, it is believed that the cure of this primer composition occurs through (i) the polymerization of the polyfunctional acrylic ester monomers with each other, (ii) by the polymerization of the organic silicon compounds with each other, and (iii) by the co-reaction between the polyfunctional acrylate monomers and/or polymers with the organic silicon compound and/or polymers thereof through the olefinic construction of each. The resultant reaction product is a thermoset resin which is tenaciously adhered to the polycarbonate substrate.

The organopolysiloxane coating is applied onto this UV cured primer. In the practice of this invention, an organopolysiloxane coating composition containing a further-curable organopolysiloxane is applied onto the cured primer and is then cured to form a thermoset organopolysiloxane coating.

The organopolysiloxane compound which is useful in the formulation of the silicone top coat that is applied to the foregoing cured primer composition is generally a silane selected from silanes of the formula $$R^5Si(OR^6)_{(4-a)} \qquad \text{VII.}$$

and silanes of the formula $$R^7_bSi(OCOR^8)_{(4-b)} \qquad \text{VIII.}$$

and partial hydrolysis and condensation products thereof where $R^5$ and $R^6$ are independently selected from monovalent hydrocarbon radicals and halogenated monovalent hydrocarbon radicals and are preferably alkyl radicals of 1 to about 8 carbon atoms and phenyl radicals, where a is zero or 1, and $R^7$ and $R^8$ are independently selected from monovalent hydrocabon radicals and halogenated monovalent hydrocarbon radicals but are preferably alkyl radicals of 1 to about 8 carbon atoms and phenyl radicals, and where b may vary from 0 to 2. The above silanes or partial hydrolysis and condensation products of such silanes are applied in anywhere from about 10% to about 100% solids, wherein the solvent is water or an organic solvent, preferably alkanol. Such silane top coat composition is then allowed to cure at a temperature anywhere from 20° to 130° C. The silicone top coat composition has to be cured preferably at an elevated temperature to effect the proper cure, but the temperature has to be below the glass transition temperature of the polycarbonate.

Such alkoxylated and acyloxy functional silanes are well known materials to silicone manufacturers and are easily obtainable. Thus, for instance, these silanes are noted in U.S. Pat. Nos. 3,720,699, 3,650,808, and 3,701,753.

These are not the only silicone top coats that may be utilized with the primer composition of the instant case. Less preferred silicone top coats which can be hydrolyzed or partially dissolved in a solvent in the foregoing solids content of 10 to 100% solids are, for instance, silicone resins composed of trifunctional and difunctional units, silicone resins composed of trifunctional units difunctional units and tetrafunctional units where the organo substituent groups in the trifunctional units may be selected from alkyl radicals of 1 to 8 carbon atoms and are preferably, methyl, phenyl, and vinyl; and wherein the organo substituent groups in the difunctional siloxy units may be selected again from alkyl radicals of 1 to 8 carbon atoms, vinyl radicals and phenyl radicals. Such silicone resins usually have an organic to silicon atom ratio of 1:1 to 1.9:1; may have a silanol content that varies anywhere from 4 to 10 weight percent and optionally may have an alkoxy content that varies from 2 to 4%. The preparation of such silicone resins which may be utilized as top coats in the invention of the instant case are, for instance, to be found in the patents of Duane F. Merrill, i.e., U.S. Pat. Nos. 3,375,223, 3,435,001, 3,450,672, 3,790,527, 3,832,319, 3,865,766, 3,887,514 and 3,925,276. However, it must be pointed out that such silicone resins are not the preferred silicone top coat materials of the invention of the instant case. The foregoing alkoxy silanes of formula VII and the foregoing acyloxy functional silanes of formula VIII are the most preferred. Other well known silicone top coat compositions for metals, plastics, ceramics, and glass may be utilized with the primer composition of the instant case. As stated previously, the foregoing alkoxy functional silanes of formula VII and the acyloxy functional silanes of formula VIII are preferred.

The foregoing silicone top coat compositions are simply brushed on, dipped on or sprayed on top of the cured primer layer that is applied to the substrate and allowed to cure at room temperature or elevated temperature. Preferably, the silicone top coat composition of the instant case is cured at elevated temperatures varying from 25° to 130° C. for a period of time of anywhere from 30 minutes to 1 hour.

In applying the organopolysiloxane coating of the instant invention, the organopolysiloxane may be produced from the aforedescribed silanes or may be purchased as a further-curable organopolysiloxane from various manufacturers in a commercially available form. If the organopolysiloxane is prepared from the silane compounds, it may generally be converted into the organopolysiloxane top coating by the following general procedure. The organosilane compound or compounds are hydrolyzed at an elevated temperature, e.g., from about 50° to about 80° C. for a period of time from about 1 to about 10 hours, in the presence of water. The temperature is then taken, e.g., from 80° to about 300° C., for a period of time sufficient to effect the removal of the byproduct alcohol and excess water. This also effects the further condensation of the product to produce a heat curable organopolysiloxane. This partially condensed organopolysiloxane is then dissolved in an organic solvent, e.g., a polar solvent such as dioxane, methanol, ethanol, butanol, acetone, ethyl acetate, benzene, xylene, toluene, etc. The heat-curable organopolysiloxane is then partially cured, e.g., at a temperature from about 90° to about 140° C. This precured, further-curable organopolysiloxane is then applied, as a coating composition containing from about 5 to about 85 weight percent of organopolysiloxane and from about 15 to about 95% by weight of the aforedescribed solvent, to the primed polycarbonate by any of the conventionally used aforedescribed methods. After the coating composition has been applied onto the primed polycarbonate, the solvent is evaporated and the organopolysiloxane is heat cured to provide a thermoset organopolysiloxane coating on the primed polycarbonate.

If the organopolysiloxane coating is to be applied from a commercially available further-curable organopolysiloxane, the following procedure is used. An organopolysiloxane coating composition is prepared by adding to a commercially available further-curable organopolysiloxane sufficient organic solvent to form a coating composition containing from about 5 to about 85% by weight of the further-curable organopolysiloxane and from about 0.5% to about 95% by weight of the organic solvent. This coating composition is then applied by any convenient method, e.g., dipping, spraying, roll-coating, brushing and the like, to the primed polycarbonate. The solvent is then evaporated and the further-curable organopolysiloxane is heat cured to provide a thermoset organopolysiloxane coating on the primed polycarbonate.

In addition to the further-curable organopolysiloxane and the solvent, the organopolysiloxane coating composition may also contain curing agents for the organopolysiloxane to accelerate the rate of cure at any selected temperature, fillers such as glass, mica, talc, silicates, and silica; flatting agents, surface-active agents, thixotropic agents, and UV light absorbers, all of which have been described hereinabove. It is, of course, understood that these optional additives may be present in an amount and of such a nature as to not deleteriously affect the curing of the organopolysiloxane, or the physical and chemical properties, such as non-opaqueness, scratch, abrasion and chemical resistance, and hardness of the cured coating.

Another embodiment of the present invention is a process of producing a polycarbonate article having a tenaciously adhered organopolysiloxane coating thereon. The process comprises: (i) applying a UV curable primer composition containing (a) a polyfunctional acrylic acid ester monomer represented by formula III, (b) an organic silicon compound containing at least one olefinically unsaturated organic group, said compound being represented by formula IV, and (c) a UV photoinitiator to a polycarbonate substrate; (ii) UV curing said primer composition to form a reaction product of said polyfunctional acrylic acid ester monomer and said organic silicon compound; (iii) applying an organopolysiloxane coating composition containing a further-curable organopolysiloxane to said cured primer; and (iv) curing said further-curable organopolysiloxane to form a thermoset organopolysiloxane coating.

PREFERRED EMBODIMENT OF THE INVENTION

In order to more fully and clearly illustrate the present invention, the following specific examples are presented. It is intended that the examples be considered as illustrative rather than limiting the invention disclosed and claimed herein.

EXAMPLE 1

An aromatic polycarbonate is prepared by reacting 2,2-bis(4-hydroxyphenyl)propane and phosgene in the presence of an acid acceptor and a molecular weight regulator and having an intrinsic viscosity of 0.57. The product is then fed to an extruder, which extruder is operated at about 265° C. and the extrudate is comminuted into pellets.

The pellets are then injection molded at about 315° C. into test panels of about 4 in. by 4 in. by about ⅛ in. thick. The test panels are subjected to an abrasion test.

The abrasion test is one wherein test panels having a ¼ inch diameter hold cut in the center are subjected to a Taber Abraser. The Taber Abraser is equipped with CS-10F wheels which are resurfaced every 200 cycles by abrading for 25 cycles on a S-11 refacing disc. The weights used in combination with the CS-10F wheels are 500 gm. weights. Initial measurements of % Haze are made at four places around the future wear track of the sample using a Gardner Hazemeter. The sample is abraded for 500 cycles, cleaned with isopropanol, and the % Haze is remeasured at the same four places. The four differences in % Haze are calculated and averaged to give the Δ% Haze. The results are set forth in Table II.

EXAMPLE 2

A primer composition is prepared by blending 50 gms. of 1,6-hexanediol diacrylate, 50 gms. of a 50% ethanolic solution of N-[3-(triethoxysilyl)propyl] maleamic acid which has been aged, i.e., allowed to stand for an extended period of time, 1.5 gms. of α,α-diethoxyacetophenone, 7.5 gms. of resorcinol monobenzoate, and 750 gms. of isobutanol. To 250 gms. of this solution are added 250 gms. of isobutanol. A thin film of this primer composition is applied to polycarbonate test panels prepared in accordance with Example 1. The film is cured by passing the polycarbonate panels through a combination Linde photocuring apparatus (this consists of a variable speed conveyor running through a chamber containing germicidal type mercury vapor lamps which emit light mainly at 2537° A, 3150° A, and 3605° A) wherein the nitrogen pressure is 25 psi nitrogen and the speed of the conveyor is 30 ft/min. The film is tack free and cured after this treatment.

EXAMPLE 3

A primer composition is prepared by blending 250 gms. of 1,6-hexanediol diacrylate, 125 gms. of an aged 50% ethanolic solution of N-[3-(triethoxysilyl)propyl] maleamic acid, 62 gms. of pentaerythitol—riacrylate, 7.5 gms. of α,α-diethoxy-acetophenone, 1.2 gms. of resorcinol monobenzoate and 600 gms. of isobutanol 250 gms. of the resulting solution is diluted in 1900 gms. of isobutanol. A thin film of this primer composition is applied to polycarbonate test panels prepared in accordance with Example 1. The film is cured by priming through a Linde photocuring apparatus as set forth in Example 2.

EXAMPLE 4

A primer composition is prepared by blending 250 gms. of 1,6-hexanediol diacrylate, 125 gms. of γ-methacryloxy-propyl trimethoxysilane, 62 gms. of trimethylolpropane triacrylate, 7.5 gms. of α,α-diethoxyacetophenone, 36.5 gms. of resorcinol monobenzoate, and 600 gms. of isobutanol. To 250 gms. of the resulting solution are added 1900 gms. of isobutanol.

EXAMPLE 5

The primed polycarbonate panels prepared in accordance with Example 2 are coated with an organopolysiloxane coating composition containing a further-curable organopolysiloxane and an alkanol solvent, the further-curable organopolysiloxane being a precured hydrolysis and partial condensation product of a methyltrialkoxy silane, e.g., methyltrimethoxysilane. After the organopolysiloxane coating composition is applied to the primed surface of the polycarbonate test panels, the coated panels are air dried for 30 minutes to evaporate the solvent, followed by a one hour bake at 250° F. to cure the organopolysiloxane. The coated panels are then subjected to the abrasion test as in Example 1 and the results are set forth in Table II.

EXAMPLE 6

The primed polycarbonate panels prepared in accordance with Example 3 are coated with an organopolysiloxane coating composition containing a further-curable organopolysiloxane and an alkanol solvent, the further-curable organopolysiloxane being a precured hydrolysis and partial condensation product of a methyltrialkoxysilane, e.g., methyltrimethoxysilane. After the organopolysiloxane coating composition is applied to the primed surface of the polycarbonate test panels, the coated panels are air dried for 30 minutes to evaporate the solvent, followed by a one hour bake at 250° F. to cure the organopolysiloxane. The coated panels are then subjected to the abrasion test as in Example 1 and the results are set forth in Table II.

TABLE II

| Example No. | % Haze |
| --- | --- |
| 1 | 34.0 |
| 5 | 4.1 |
| 6 | 2.3 |

As seen from Table II, the present invention provides coated polycarbonate articles which are resistant to abrasion and wherein the organopolysiloxane top coat is tenaciously adhered, by means of the primer layer, to the polycarbonate substrate.

Although the above examples have shown various modifications of the present invention, other variations are possible in the light of the above teachings, especially in the compositions of the organopolysiloxane coating composition. It is, therefore, to be understood that changes may be made in the particular embodiments of the invention described which are within the full intended scope of the invention as defined by the appended claims.

What I claim as new and desire to secure by Letters Patent of the United States is:

1. A coated article having improved abrasion and chemical solvent resistance comprising a polycarbonate substrate coated with (i) an adhesion promoting primer layer comprised of the photoreaction products of (a) at least one polyfunctional acrylic acid ester monomer, and (b) at least one organic silicon compound represented by the general formula

wherein c is an integer from 1 to 3 inclusive, X is an alkoxy, acyloxy, or aryloxy radical, and $R^3$ represents a radical selected from

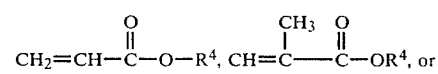

-continued

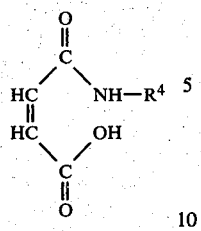

wherein R⁴ is a divalent saturated aliphatic hydrocarbon radical; and (ii) a cured thermoset organopolysiloxane containing top coat on said primer layer.

2. The article of claim 1 wherein said polyfunctional acrylic acid ester monomer is represented by the formula

wherein n is an integer from 2 to 4 inclusive, and R¹ is selected from the group consisting of a n valent saturated aliphatic hydrocarbon radical, n valent substituted saturated aliphatic hydrocarbon radical, n valent olefinically unsaturated aliphatic hydrocarbon radical, n valent substituted olefinically unsaturated aliphatic hydrocarbon radical, n valent ether radical, n valent substituted ether radical, n valent polyether radical, n valent substituted polyether radical, n valent aromatic hydrocarbon radical, and n valent substituted aromatic hydrocarbon radical.

3. The article of claim 2 wherein R¹ is selected from the group consisting of a n valent saturated aliphatic hydrocarbon radical, n valent olefinically unsaturated aliphatic hydrocarbon radical, n valent ether radical, n valent polyether radical, and n valent aromatic hydrocarbon radical.

4. The article of claim 3 wherein R¹ is selected from the group consisting of a n valent saturated aliphatic hydrocarbon radical, n valent ether radical, and n valent polyether radical.

5. The article of claim 1 wherein R³ represents a radical having the formula

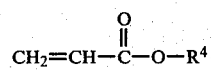

wherein R⁴ is a divalent saturated aliphatic hydrocarbon radical.

6. The article of claim 1 wherein R³ represents a radical having the formula

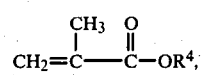

wherein R⁴ is a divalent saturated aliphatic hydrocarbon radical.

7. The article of claim 1 wherein R³ represents a radical having the formula

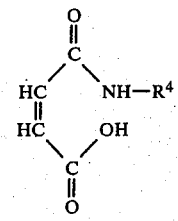

wherein R⁴ is a divalent saturated aliphatic hydrocarbon radical.

8. The article of claim 5 wherein X is an alkoxy radical and c is 1.

9. The article of claim 8 wherein said alkoxy radical is an ethoxy radical.

10. The article of claim 8 wherein said alkoxy radical is a methoxy radical.

11. The article of claim 6 wherein X is an alkoxy radical and c is 1.

12. The article of claim 11 wherein said alkoxy radical is an ethoxy radical.

13. The article of claim 11 wherein said alkoxy radical is a methoxy radical.

14. The article of claim 7 wherein X is an alkoxy radical and c is 1.

15. The article of claim 14 wherein said alkoxy radical is an ethoxy radical.

16. The article of claim 14 wherein said alkoxy radical is a methoxy radical.

17. The article of claim 1 wherein said primer layer contains an ultraviolet light absorbing compound.

18. The article of claim 1 wherein said coated article is non-opaque.

19. The article of claim 17 wherein said coated article is in the form of a sheet.

20. An ultraviolet light curable primer composition for improving the adhesion of a thermoset organopolysiloxane containing top coat to a polycarbonate substrate comprising (i) at least one polyfunctional acrylic acid ester monomer; (ii) at least one organic silicon compound represented by the general formula

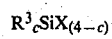

wherein c is an integer from 1 to 3 inclusive, X is an alkoxy, acyloxy, or aryloxy radical, and R³ represents a radical selected from

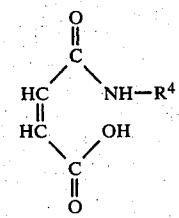

wherein R⁴ is a divalent saturated aliphatic hydrocarbon radical; and (iii) a photoinitiator.

21. The composition of claim 20 wherein said polyfunctional acrylic acid ester monomer is represented by the formula

wherein n is an integer from 2 to 4 inclusive and $R^1$ is selected from the group consisting of a n valent saturated aliphatic hydrocarbon radical, n valent substituted saturated aliphatic hydrocarbon radical, n valent olefinically unsaturated aliphatic hydrocarbon radical, n valent substituted olefinically unsaturated aliphatic hydrocarbon radical, n valent ether radical, n valent substituted ether radical, n valent polyether radical, n valent substituted polyether radical, n valent aromatic hydrocarbon radical, and n valent substituted aromatic hydrocarbon radical.

22. The composition of claim 21 wherein $R^1$ is selected from the group consisting of a n valent saturated aliphatic hydrocarbon radical, n valent olefinically unsaturated aliphatic hydrocarbon radical, n valent ether radical, n valent polyether radical, and n valent aromatic hydrocarbon radical.

23. The composition of claim 22 wherein $R^1$ is selected from the group consisting of a n valent saturated aliphatic hydrocarbon radical, n valent ether radical, and n valent polyether radical.

24. The composition of claim 20 wherein X is an alkoxy radical and c is 1.

25. The composition of claim 24 wherein said alkoxy radical is a lower alkoxy radical.

26. The composition of claim 20 which further contains an ultraviolet light screener.

27. A process for providing a uniformly and tenaciously adhered abrasion and chemical solvent resistant organopolysiloxane coating onto a polycarbonate substrate which comprises: (i) applying onto said substrate a photocurable primer composition comprised of (a) at least one polyfunctional acrylic acid ester monomer, (b) at least one organic silicon compound represented by the general formula

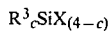

wherein c is an integer from 1 to 3 inclusive, X is an alkoxy, acyloxy, or aryloxy radical, and $R^3$ is a radical represented by the formulae

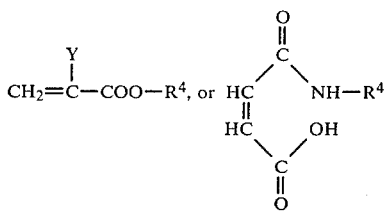

wherein Y is a hydrogen or methyl, and $R^4$ is a divalent saturated aliphatic hydrocarbon radical, and (c) a photoinitiator; (ii) curing said primer composition by means of ultraviolet radiation; (iii) applying a top coat composition comprised of a further-curable organopolysiloxane onto said cured primer layer; and, (iv) curing said further-curable organopolysiloxane to a thermoset condition.

28. The process of claim 27 wherein said polyfunctional acrylic acid ester monomer is represented by the formula

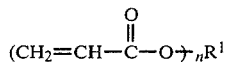

wherein n is an integer from 2 to 4 inclusive, and $R^1$ is selected from the group consisting of a n valent saturated aliphatic hydrocarbon radical, n valent substituted saturated aliphatic hydrocarbon radical, n valent olefinically unsaturated aliphatic hydrocarbon radical, n valent substituted olefinically unsaturated aliphatic hydrocarbon radical, n valent ether radical, n valent substituted ether radical, n valent polyether radical, n valent substituted polyether radical, n valent aromatic hydrocarbon radical, and n valent substituted aromatic hydrocarbon radical.

29. The process of claim 28 wherein $R^1$ is selected from the group consisting of a n valent saturated aliphatic hydrocarbon radical, n valent olefinically unsaturated aliphatic hydrocarbon radical, n valent ether radical, n valent polyether radical, and n valent aromatic hydrocarbon radical.

30. The process of claim 29 wherein $R^1$ is selected from the group consisting of a n valent saturated aliphatic hydrocarbon radical, n valent ether radical, and n valent polyether radical.

31. The process of claim 28 wherein $R^3$ is a compound represented by the formula $$CH_2=CH-COO-R^4$$

wherein $R^4$ is a divalent saturated aliphatic hydrocarbon radical.

32. The process of claim 28 wherein $R^3$ is a compound represented by the formula

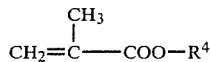

wherein $R^4$ is a divalent saturated aliphatic hydrocarbon radical.

33. The process of claim 28 wherein $R^3$ is a compound represented by the formula

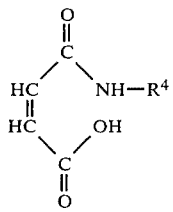

wherein $R^4$ is a divalent saturated aliphatic hydrocarbon radical.

34. The process of claim 31 wherein X is an alkoxy radical and c is 1.

35. The process of claim 32 wherein X is an alkoxy radical and c is 1.

36. The process of claim 33 wherein X is an alkoxy radical and c is 1.

* * * * *